United States Patent
Maciejak et al.

(10) Patent No.: US 10,169,586 B2
(45) Date of Patent: Jan. 1, 2019

(54) RANSOMWARE DETECTION AND DAMAGE MITIGATION

(71) Applicant: Fortinet, Inc., Sunnyvale, CA (US)

(72) Inventors: David Maciejak, Singapore (SG); Low Chin Yick, Singapore (SG)

(73) Assignee: Fortinet, Inc., Sunnyvale, CA (US)

( * ) Notice: Subject to any disclaimer, the term of this patent is extended or adjusted under 35 U.S.C. 154(b) by 189 days.

(21) Appl. No.: 15/396,531

(22) Filed: Dec. 31, 2016

(65) Prior Publication Data

US 2018/0189490 A1    Jul. 5, 2018

(51) Int. Cl.
*G06F 21/56*    (2013.01)

(52) U.S. Cl.
CPC ...... *G06F 21/566* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 8,549,643 B1* | 10/2013 | Shou | ...................... | G06F 21/556 |
| | | | | 455/410 |
| 8,990,932 B2 | 3/2015 | Ngair | | |
| 9,317,686 B1 | 4/2016 | Nanjing et al. | | |
| 9,413,782 B1* | 8/2016 | Adams | ................ | H04L 63/1416 |
| 2014/0007228 A1 | 1/2014 | Ngair | | |
| 2014/0181971 A1 | 6/2014 | Tatarinov et al. | | |
| 2015/0026027 A1* | 1/2015 | Priess | ................... | G06Q 40/00 |
| | | | | 705/35 |
| 2015/0058987 A1 | 2/2015 | Thure | | |
| 2015/0058988 A1* | 2/2015 | Katz | ...................... | H04L 63/145 |
| | | | | 726/23 |
| 2016/0323316 A1* | 11/2016 | Kolton | ................... | H04L 63/145 |
| 2018/0121650 A1* | 5/2018 | Brown | ................... | G06F 21/565 |
| 2018/0157834 A1* | 6/2018 | Continella | .......... | G06F 17/3007 |

OTHER PUBLICATIONS

HitmanPro-Alert Brochure. Bullet-Proof Vest for your Applications and Data, Stops Exploits and Malware from Cyber-Insurgents and (Nation-State) Attackers. SurfRight. 2015. 2pgs.

* cited by examiner

*Primary Examiner* — Michael R Vaughan
(74) *Attorney, Agent, or Firm* — Hamilton, DeSanctis & Cha LLP

(57) ABSTRACT

Systems and methods for file encrypting malware detection are provided. According to one embodiment, a monitoring module is installed within active processes running on a computer system by a kernel mode driver. Performance of a directory traversal operation on a directory of the computer system is detected by a monitoring module of a first process of the multiple active processes in which a parameter of the traversal operation includes a wildcard character. When a number of wildcard-based directory traversal operations performed by the first process exceeds a threshold, a decoy file is deployed by the monitoring module within the directory and the driver is notified. The driver monitors for and detects an attempt by the first process to tamper with the decoy file by intercepting and evaluating file system operations. Responsive to detection of the attempt, the first process is confirmed to be a malware process and is terminated.

19 Claims, 11 Drawing Sheets

| Time Stamp 302 | Process Name 304 | Process Identifier 306 | Operation Type 308 | Path 310 |
|---|---|---|---|---|
| 4:00:1... | xkccnma.exe | 2840 | WriteFile | C:\ARansomwareLog.txt |
| 4:00:1... | xkccnma.exe | 2840 | WriteFile | C:\Users\Analyst\Appdata\Local\Temp\AntiRansomwareMonitoringFileLog_xkccnma_exe_2840.txt |
| 4:00:1... | xkccnma.exe | 2840 | QueryDirectory | C:\* |
| 4:00:1... | xkccnma.exe | 2840 | QueryDirectory | C:\$Recycle.Bin\* |

314

Start Traversing "All" Folders

FIG. 3A

| Time Stamp 302 | Process Name 304 | Process Identifier 306 | Operation Type 308 | Path 310 |
|---|---|---|---|---|
| 4:00:1... | xkccnma.exe | 2840 | QueryDirectory | C:\bin\Debugger\* |
| 4:00:1... | xkccnma.exe | 2840 | WriteFile | C:\Users\Analyst\Appdata\Local\Temp\AntiRansomwareMonitoringFileLog_xkccnma_exe_2840.txt |
| 4:00:1... | xkccnma.exe | 2840 | WriteFile | C:\bin\Debugger\OllyDebug\Ollydbg Plugins\Ollydbg Plugins\ollyscript\ARansomDecoyFile16_2840.txt |
| 4:00:1... | xkccnma.exe | 2840 | WriteFile | C:\ARansomwareLog.txt |

Threshold For Number Of Traversing Directory Reached, Decoy File Deployed

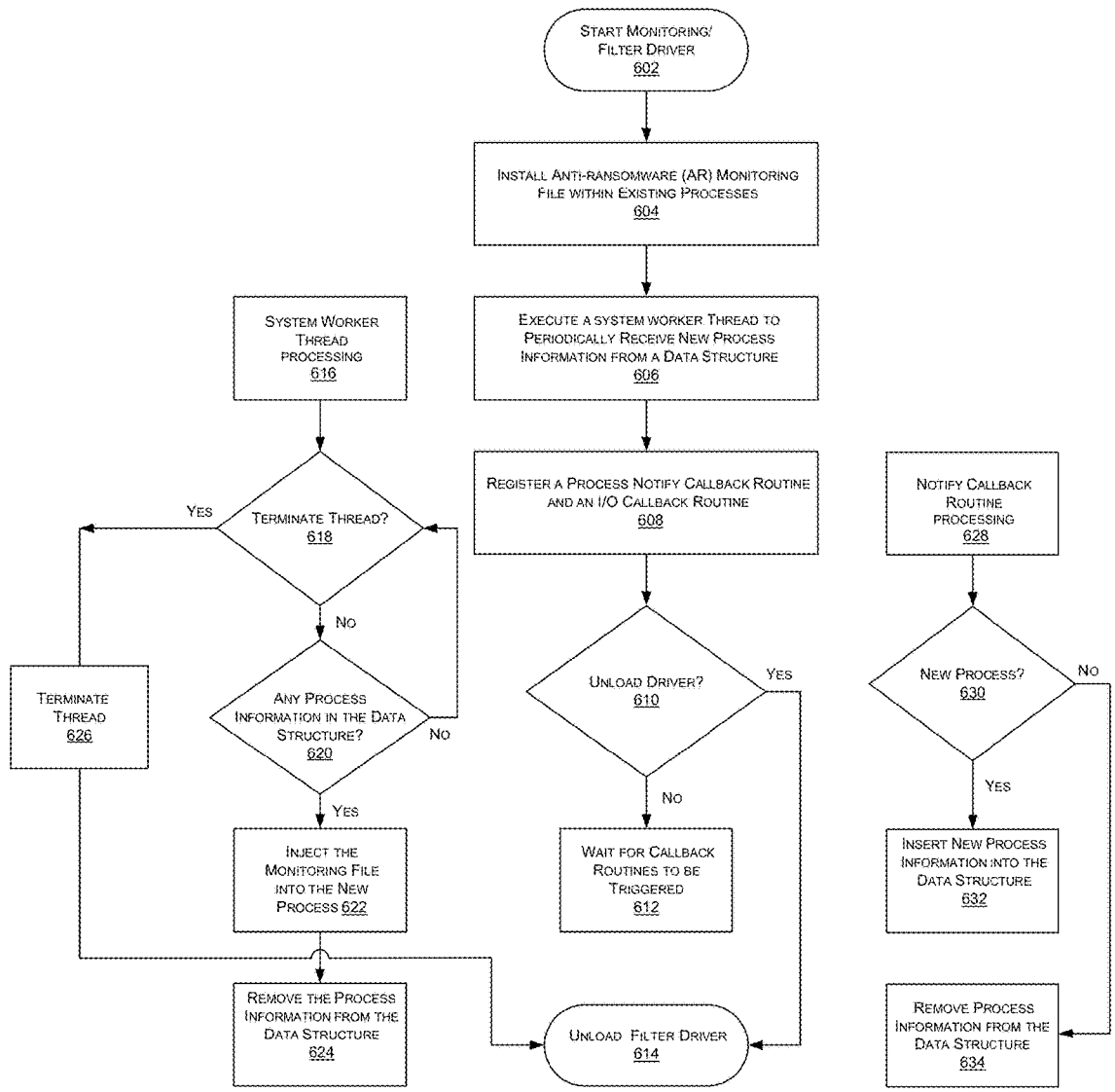

RANSOMWARE DETECTION AND DAMAGE MITIGATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to network and computer security. In particular, embodiments of the present invention relate to detection and mitigation of ransomware attacks.

Description of the Related Art

In a world of computer networks, malware attacks, threats, and infections such as viruses, Trojan horses, rootkits, backdoors, and evasion have gained a lot of attention among users. Different infections have different objectives. For example, viruses usually aim to destroy data in a computing device, rootkits modify an operating system and stay in a hidden form, and ransomware typically executes a cryptovirology attack and demands a ransom payment from a victim. If the payment is not provided, all or some of the data encrypted by the ransomware remains permanently locked. The Federal Bureau of Investigation (FBI) has recently disclosed that victims of ransomware malicious attacks paid out $24 million during 2015 and have paid out approximately $209 million in the first quarter alone of 2016.

Various types of ransomware exist in the market and target a range of users such as PC users, enterprise network endpoints, cloud, servers, and therefore have a negative impact on multiple sectors such as private business, healthcare, and government. Ransomware interferes with computer system access, encrypts files, and interrupts execution of certain applications (e.g., web browsers) so as to blackmail the victim into paying a ransom, for example, to restore the impacted computing device(s).

There are various solutions in the cyber security market that purport to deal with ransomware attacks, but current solutions are merely signature-based solutions, which lack in effectiveness for several reasons, one of which is the regular appearance of new variants. As such, signature-based protection is reactive in nature and can only detect known variants.

Another reason for failure of signature-based solutions is the adoption of polymorphism mechanisms by ransomware creators, which effectively provides a malware factory that can generate a new sample every few seconds, effectively bypassing conventional signature-based detection mechanisms.

There is therefore a need for improved systems and methods to effectively and efficiently detect and mitigate ransomware attacks.

SUMMARY

Systems and methods are described for behavior-based file encrypting malware detection. According to one embodiment, a file system event monitoring module is installed within each of multiple active processes running on a computer system by a kernel mode driver running on the computer system. Performance of a directory traversal operation on a directory of a file system of the computer system is detected by a first file system event monitoring module installed within a first process of the multiple active processes in which a parameter of the directory traversal operation includes at least one wildcard character. When a number of wildcard-based directory traversal operations performed by the first process meets or exceeds a false positive threshold, a decoy file is deployed by the first file system event monitoring module within the directory and the kernel mode driver is notified regarding deployment of the decoy file. The kernel mode driver monitors for and detects an attempt by the first process to tamper with the decoy file by intercepting and evaluating file system operations. Responsive to detection of the attempt, the first process is identified as a malware process (e.g., a ransomware process) by the kernel mode driver and the kernel mode driver causes the malware process to be terminated.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 3A to 3E illustrate tables reflecting file system events performed by ransomware that are detected by a ransomware detection system as well as file system events performed by the ransomware detection system in accordance with an embodiment of the present invention.

FIGS. 6A to 6F illustrate flow diagrams showing an exemplary implementation of detection and termination of a ransomware process in accordance with an embodiment of the present invention.

DETAILED DESCRIPTION

Figure 1A:
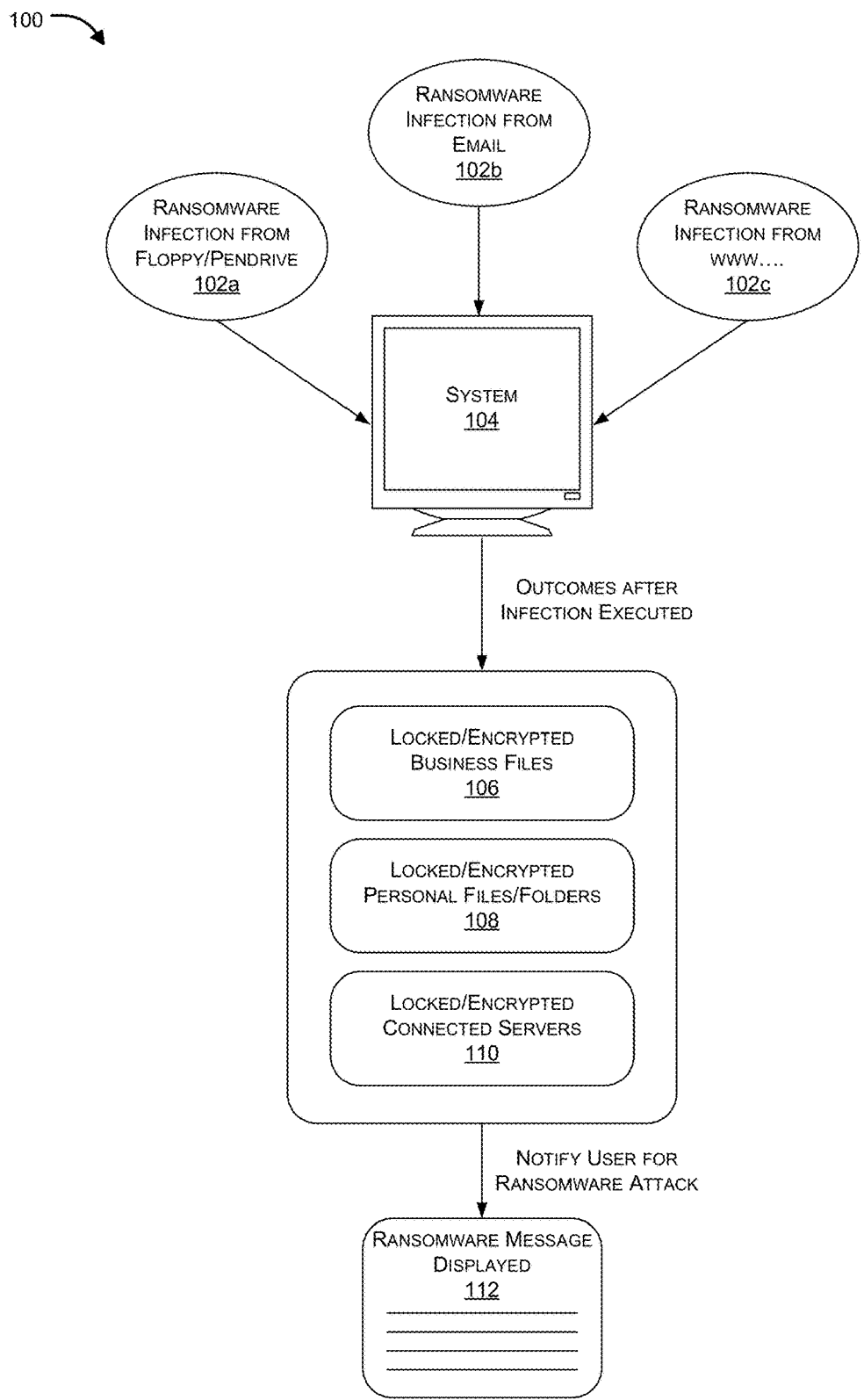
FIG. 1A illustrates an existing ransomware infection spreading mechanism.

Systems and methods are described for behavior-based file encrypting malware detection. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Embodiments of the present invention generally relate to network and computer security. In particular, embodiments of the present invention relate to detection and mitigation of ransomware attacks.

According to one embodiment, a computer system is provided comprising: a non-transitory storage device having embodied therein one or more routines operable to detect and terminate a detected ransomware process; and one or more processors coupled to the non-transitory storage device and operable to execute the one or more routines, wherein the one or more routines include a file system event monitoring module, which when executed by the one or more processors, intercepts one or more processes that perform a directory traversal operation within a file system of the computer system using at least one wildcard character; a decoy file deployment module, which when executed by the one or more processors, evaluates, for each of the one or more processes, whether a false positive threshold has been met or has been exceeded and deploying at least one decoy file responsive thereto; and a decoy file tampering detection module, which when executed by the one or more processors, monitors and detects, through a monitoring driver and/or a thread associated therewith, whether the deployed at least one decoy file is attempted to be tampered with by the process that caused it to be deployed, for example, and causes the ransomware process to be terminated upon such detection.

In an aspect, the termination of the ransomware process can be performed by the file system event monitoring module under instructions from the monitoring driver. In an aspect, the monitoring driver can include a filter driver enabled to intercept an Input/Output (I/O) operation to the file system.

In an aspect, one or more processes can include currently running processes as well as new run-time processes.

In an aspect, the file system event monitoring module can be implemented within a dynamically linked shared library (e.g., a Dynamic Linked Library (DLL)) where the dynamically linked shared library can be injected into each of the one or more processes.

In an aspect, at least one decoy file can be deployed in each folder or directory of the file system being traversed by the one or more processes based on the number of wildcard-based directory traversals performed by the process at issue. In an aspect, the deployed files can be removed after termination of the process.

In an aspect, one or more routines can further include an unloading module, which when executed by the one or more processors, unloads the file system event monitoring module after termination of the process.

In an aspect, at least one wildcard character is selected from any or a combination of '*' and '?'.

In an aspect, one or more processes that have triggered deployment of a decoy file can be tracked by inserting a reference to or an identifier (e.g., a process identifier (PID)) of each of the one or more processes within a data structure maintained by the driver and/or a thread associated therewith.

In one embodiment, a method for detecting and mitigating ransomware attacks includes: installing, by a driver running on a computer system, a file system event monitoring module within each of multiple active processes running on the computer system; and detecting, by a first file system event monitoring module installed within one of the active processes, performance of a directory traversal operation within a file system of the computer system in which the directory traversal operation uses at least one wildcard character. The method can further include the step of, when the number of wildcard-based directory traversal operations performed by the particular process meets or exceeds a false positive threshold, then the file system event monitoring module deploys a decoy file within the directory at issue and notifies the driver and/or a thread associated therewith to monitor the decoy file. When the driver detects an attempt to tamper with the decoy file by the process that caused it to be deployed, for example, then the driver identifies the process as a ransomware process and causes the ransomware process to be terminated.

In an aspect, the ransomware process can be terminated when the driver directs the first file system event monitoring module to terminate the process. In another aspect, the active processes include processes running on the computer system at a time at which the driver is installed on the computer system and new run-time processes that are created after installation of the driver.

While, for convenience, various embodiments of the present invention may be described with reference to a Microsoft® Windows® environment and the use of a Microsoft® Windows® kernel mode driver, the present invention is equally applicable to various other operating system environments (e.g., Unix, Linux, Apple's Mac OS X and Android) and other applications in which monitoring and/or enforcement of software activity is desired.

Similarly, while, for convenience, various embodiments of the present invention may be described with reference to crypto-ransomware, the present invention is equally applicable to various other types of malware, including, but not limited to adware, bots, bugs, rootkits, spyware, Trojan horses, viruses, and worms.

FIG. 1A illustrates an existing ransomware infection spreading mechanism. As illustrated, a computer system 104 may receive ransomware infections from multiple sources, including, from a floppy/pen drive 102a, an electronic mail (email) message 102b, or a website 102c, which may be collectively referred to as ransomware sources 102 hereinafter. Ransomware is a class of malware that restricts access to the computer system 104 or part thereof that it infects, and often requires that a ransom be paid to the creator of the malware in order for the restrictions to be removed. Some forms of ransomware encrypt files on the computer's hard drive, while others may simply lock the computer; in any case, the ransomware displays messages intended to convince the user to pay the ransom. Basically, ransomware can be classified into two categories: encrypting ransomware (a/k/a: crypto-ransomware) and non-encrypting ransomware. Encrypting ransomware encrypts personal files on the hard drive. More sophisticated ransomware malware may encrypt the victim's data with a random symmetric key and a fixed public key. By design, the malware author is the only one who knows the necessary symmetric key or private decryption key. The malware author is then in a position to demand a ransom, and, in some cases, even if the victim pays money to the cybercriminal or does something on behalf of the cybercriminal (e.g., spreading the malware) the cybercriminal may not decrypt the hard drive. It can be a disaster for a computer user to lose years' worth of data, pictures and files. The situation can be much worse for an enterprise if the malware encrypts all of the data that employees need to access on a corporate network. Those skilled in the art will appreciate that although various embodiments of the present invention will be described herein with reference to ransomware, the methodologies described herein are thought to be applicable to other forms of malicious software or malware including but not limited to computer viruses, worms, trojan horses, rootkits, keyloggers, dialers, spyware, adware, malicious browser helper objects (BHOs), or rogue security software.

Computer system 104 can include, but is not limited to, a desktop computer, laptop computer, file server, mainframe computer, tablet computer, or even a mobile/smart phone. An operating system of the computer includes a kernel mode (in which processes managed by the operating system are executed), and a user mode (in which user processes are executed).

In response to triggering and activation of ransomware on computer system 104, one or more activities can be performed, for instance, business files can be locked/encrypted 106, personal files/folders can be locked/encrypted 108, and connected servers can be locked/encrypted 110. After the ransomware has locked/encrypted the files, a user of computer system 104 may be notified regarding the ransomware attack via the display of a ransomware infection message 112 on a display screen of computer system 104, which typically seeks payment of money in exchange for unlocking/decrypting the effected files.

Figure 1B:
FIG. 1B illustrates an example of a ransom message.

FIG. 1B illustrates an example of a ransom message 150. In the present example, ransomware message 150 is displayed on an infected computer system and informs the user that data/files existing on the computer system have been locked and that access to the locked data can be regained by making a payment of 1 bitcoin valued as today more than USD 940. The ransom demanded may be made via a variety of payment methods, e.g., MoneyPak, Ukash, cashU, Ethereum and Bitcoin.

Figure 2A:
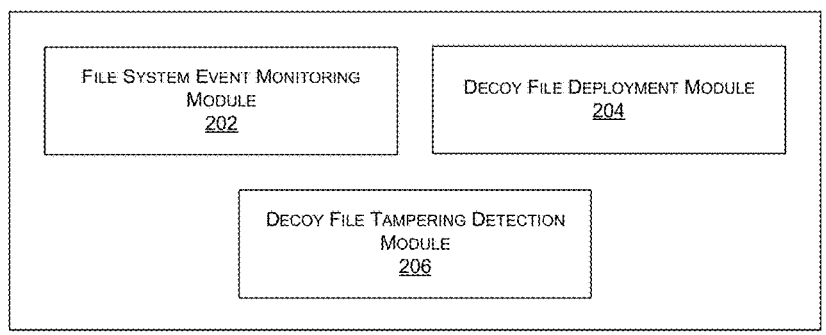
FIG. 2A illustrates exemplary functional modules of a ransomware detection system for detecting and terminating a ransomware process in accordance with an embodiment of the present invention.

FIG. 2A illustrates exemplary functional modules of a ransomware detection system 200 for detecting and terminating a ransomware process in accordance with an embodiment of the present invention. The functional modules can be implemented in a computer system having one or more processors that are configured to execute one or more software routines.

In the present example, ransomware detection system 200 includes a file system event monitoring module 202 configured to intercept one or more processes that perform a directory traversal operation within a file system of the computer system using at least one wildcard character; a decoy file deployment module 204 configured to evaluate, for each of the one or more processes, whether a false positive threshold has been exceeded and deploying at least one decoy file responsive thereto; and a decoy file tampering detection module 406 configured to monitor and detect, through a monitoring driver and/or a thread associated therewith, whether the deployed at least one decoy file is attempted to be tampered with and terminate the ransomware process responsive to such detection.

According to one embodiment, file system event monitoring module 202 can be configured to intercept any process that attempts to perform a directory traversal operation within a file system of the computer system. A directory traversal operation making use of one or more wildcard characters, e.g. '*', '.', '?', and the like, or those that otherwise do not limit the traversal to a subset of the contents of the directory at issue are of particular interest as the goal of encrypting ransomware is to encrypt critical user files and/or operating system files. For example, encrypting ransomware may seek to encrypt all files stored within the local file system (i.e., all files in every directory of the computer system on which the encrypting ransomware is running).

In one embodiment, file system event monitoring module 202 is implemented as part of a monitoring driver and/or one or more threads associated therewith that operate in kernel mode and hook low level operating system application programming interfaces (APIs) to intercept various operating system and/or file system input/output (I/O) activity. In this manner, file system event monitoring module 202 may determine whether the directory traversal operation at issue is one that requires action by evaluating the parameters of the directory traversal operation for presence of a wildcard character or the lack of limitations on the results to be returned by the directory traversal operation. In another embodiment, file system event monitoring module 202 can implemented within a dynamically linked shared library that is injected into each of the one or more active processes running on the computer system at issue at the time system 200 is launched and can also be injected into new processes created after system 200 is launched.

Directory traversal operations may enable a traversal through (e.g., a listing of) all files and/or sub-directories and/or folders available in a particular directory (in which the directory traversal operation is performed). For example, in the case of the Microsoft Windows™ Operating System, a directory traversal operation can be performed on the C drive of a computer system using the following Disk Operating System (DOS) syntax:

dir [<drive>: ] [<path>] [<filename>][ . . . ]

As those skilled in the art appreciate, issuance of a directory traversal operation in the form of "dir C: \*" instructs the file system to traverse/scan the entire set of files/folders present on the C drive. In a similar fashion, any sub-folder of the computer system can also be traversed to list all files/folders present in that sub-folder. Notably, directory traversals are not limited to providing a listing of directories/files stored within a local file system (e.g., files stored on a hard drive of the computer system issuing the command), but may also perform a directory traversal on computing systems/devices that are operatively coupled with the issuing computer system, say by means of a communication network such as Local Area Network (LAN).

In one embodiment, file system event monitoring module 202 is configured to track one or more processes identified as being associated with potential ransomware by inserting a reference to or a PID of each of the one or more processes within a data structure maintained by the driver and/or a thread associated therewith.

According to an embodiment, a decoy file deployment module 204 can be configured to evaluate, for each of the one or more tracked processes, whether a false positive threshold has been met or exceeded for wildcard-based directory traversals, and accordingly deploy a decoy file responsive thereto within the directory at issue. In an aspect, while evaluating directory traversals performed by the one or more tracked processes, a counter can be incremented each time a tracked process employs a wildcard character in a directory traversal operation and a decoy file can accordingly be deployed, for instance, in each folder or directory of the file system being traversed by the one or more tracked processes once the counter meets the predetermined or configurable false positive threshold. For instance, a threshold of X can be defined such that processes performing fewer than X wildcard-based directory traversal operations will not cause the decoy file to be deployed.

In an aspect, file attribute(s), file content, file type, or any other attribute of the decoy file can be adapted in such a way that the randomness of the file content/attribute(s) and/or the file type can defeat identification of the decoy file by ransomware processes.

In one embodiment, file tampering detection module 206 is configured to monitor and detect, through the monitoring driver (which may also be simply referred to as the "driver" herein), whether a deployed decoy file is attempted to be tampered with, determines whether the process at issue is ransomware and terminates the ransomware process upon such detection.

In an exemplary implementation, the monitoring driver and/or a thread associated therewith can be informed by file system event monitoring module 202 (which may also be referred to as a monitoring file herein) about the deployment of one or more decoy files, based on which information, the driver and/or a thread associated therewith can start monitoring and protecting the decoy file such that as soon as the driver detects/determines that an attempt is being/has been made to tamper with the deployed decoy file, the monitoring driver can alert the file system event monitoring module 202/monitoring file to execute appropriate action(s) and terminate the detected ransomware process. In an aspect, execution of action(s) can be include, but are not limited to, termination of the ransomware process, deletion of the deployed decoy file, deletion/updating of event logs, among other configured actions.

In an aspect, the monitoring driver can include a filter driver that is enabled to intercept an Input/Output (I/O) operation (e.g., open, read, write or delete) in relation to the file system, and thereby detect tampering of the deployed decoy file by one of the running processes, and also enable termination of the detected ransomware process. In an aspect, in response to loading of the monitoring driver, all processes currently running on a protected computer system can be modified to include file system event monitoring module 202 so as to allow file system event monitoring module 202 to intercept and evaluate performance of directory traversal operations by the process at issue.

In an aspect, a tampering attempt on the deployed decoy file by the detected ransomware process can be any or a combination of an access, write, read, encrypt, delete, or lock operation.

In an aspect, the monitoring driver can monitor one or more new processes spawned and all such processes can be inserted into a new process data structure that can include, but is not limited to, a linked list, a stack, a queue, among other appropriate data structures. In an aspect, the new process data structure can be periodically checked for the existence of new processes that have been spawned after initiation of the driver so as to allow file system event monitoring module 202 to be injected therein. In an aspect, in response to injecting file system event monitoring module 202, the newly spawned processes may be deleted from the new process data structure. In one embodiment, injection/association of file system event monitoring module 202 can be performed in real-time, i.e., as soon as a new process (run-time process) is spawned, file system event monitoring module 202 can be injected therein to begin intercepting and evaluating directory traversal operations carried out by the new process.

In an aspect, monitoring driver and/or a thread associated therewith can intercept any attempt to access (e.g., open, read, write, delete, execute or the like) the deployed decoy file. When any such access attempt is made on the deployed decoy file by the process that caused the decoy file to be deployed, for example, the monitoring driver can send a notification to alert file system event monitoring module 202 about the attempted tampering. Alternatively, any attempt to access or certain predetermined or configurable types of attempts to access (e.g., an attempt to write or an attempt to delete) the decoy file regardless of the process initiating the attempt to access can trigger a notification to alert file system event monitoring module 202.

In an aspect, when file system event monitoring module 202 terminates the detected ransomware process upon receiving the tampering notification from the monitoring driver, system 200 can call an unloading module (not shown) that unloads or uninstalls file system event monitoring module 202 as the case may be depending upon the particular implementation. The deployed decoy file(s) can also be removed, deleted, or rendered invalid upon such termination of the detected ransomware process.

Figure 2B:
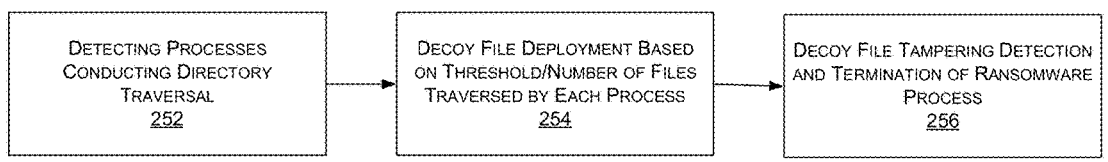
FIG. 2B illustrates an exemplary block diagram for decoy file deployment in accordance with an embodiment of the present invention.

FIG. 2B illustrates an exemplary block diagram for decoy file deployment in accordance with an embodiment of the present invention. Block 252 illustrates a monitoring file (e.g., file system event monitoring module 202) that is configured to intercept one or more processes (such as abc.exe and def.exe and fgh.exe, and so on) that perform a directory traversal operation within a file system of the computer system using at least one wildcard character.

Block 254 illustrates that in response to a directory traversal performed by a particular process, a counter can be initiated for the particular process. The counter can thereafter be incremented each time the process subsequently performs a directory traversal operation that contains a parameter having one or more wildcard characters. Once a false positive threshold has been met by the counter, a decoy file can be deployed in the folder/directory at issue in the directory traversal operation. In an aspect, decoy file deployment can be informed by the monitoring file to a monitoring driver, wherein the monitoring driver can then monitor and protect (from any tampering operation) the deployed decoy file.

Block 256 illustrates the monitoring driver being configured to monitor and detect whether the deployed decoy file is attempted to be accessed by any of the one or more tracked processes. In an aspect, the monitoring driver can detect a ransomware process when a tampering attempt is made on a deployed decoy file, and upon such detection, the monitoring driver can halt the attempt to access the decoy file and alert the monitoring file to take appropriate action, for example, termination of the ransomware process.

In an aspect, in response to termination of the detected/identified ransomware process, the monitoring file can also be unloaded. In another aspect, deployed decoy file(s) can also be deleted from the file system. It should be appreciated that multiple decoy files may need to be deployed, for example, when a process traverses across multiple folders/directories, one decoy file may ultimately be deployed for each folder after the false positive threshold has been reached for the process. Once a process (e.g., one identified as malware or ransomware or one that has caused one or more decoy files to be deployed and which does not end up being classified as malware or ransomware) terminates, all decoy files deployed for that process may be removed. For example, once a ransomware process has been identified, all the decoy files deployed for that process may be removed.

FIGS. 3A to 3E illustrate tables reflecting file system events performed by ransomware that are detected by a ransomware detection system as well as file system events performed by the ransomware detection system in accordance with an embodiment of the present invention.

FIG. 3A depicts a table including details of a particular process executing in a computer system protected by a ransomware detection system in accordance with an embodiment of the present invention. The table depicted in FIG. 3A includes a column for each of a time stamp 304, a process name 306, a process identifier (PID) 308, an operation type 310, and a path 312. In the context of the present example, a process having a process name of "xkccnma.exe" has a PID of 2840. Each operation performed by the process corresponds to a row in the table and contains the time at which the operation was performed, the name of the process performing the operation, a PID of the process performing the operation, the type of the operation and the path specified by the operation. In an aspect, the path can indicate a directory/drive/folder that is being traversed by the process, for example path 314 involves the use of a wildcard character '*' to traverse the 'C' drive, wherein C:\* can traverse all the files/folders present in 'C' drive.

FIG. 3B depicts the deployment of a decoy file in accordance with an embodiment of the present invention. As noted above, decoy file deployment can be performed when the number of directory traversals performed by a particular process meets a false positive threshold. In an aspect, a decoy file can be deployed in the directory being traversed when the false positive threshold is met and in every directory traversed thereafter with the use of a wildcard character. For example, when traversing of the 'C' drive is performed using a wildcard character (e.g., "dir C:\*"), a decoy file (ARansomDecoyFile16_2840.txt) can be deployed in path 316 (C:\bin\Debugger\OllyDebug\OllydbgPlugins\OllydbgPlugins\ollyscript\ARansomDecoyFile16_2840.txt) responsive to the number of QueryDirectory operations performed by the xkccnma.exe process having met the false positive threshold. In an aspect, in response to deployment of the decoy file, monitoring driver can be informed about the decoy file deployment, the PID of the process that triggered the deployment and/or the path where decoy file resides.

Figure 3C:
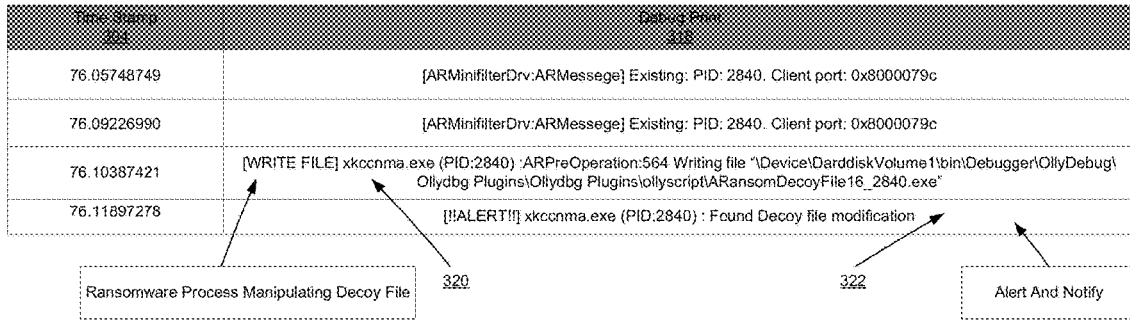

FIG. 3C is a debug dump showing tampering with the deployed decoy file by a ransomware process. The debug dump is presented in two columns a time stamp 304 column and a debug print 318 column. In the present example, the tampering/manipulation of the decoy file is represented by a write operation 320. In response to determining (by the monitoring driver) that a tampering operation has been attempted on the deployed decoy file by a process (i.e., xkccnma.exe) having a PID (i.e., 2840) that previously triggered deployment of the decoy file, an alert 322 can be generated to notify the monitoring file about the tampering attempt by the now confirmed ransomware process.

Figure 3D:
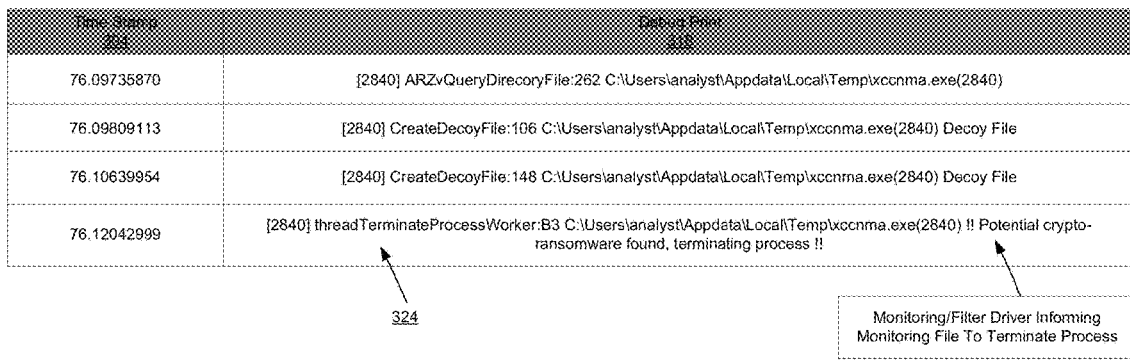

FIG. 3D is a debug dump showing, in response to receiving an alert by the monitoring driver, the monitoring file terminating the confirmed ransomware process. In an aspect, the monitoring driver can instruct the monitoring file to terminate the ransomware process so that the ransomware process does not further negatively affect the computer system. In the present example, the monitoring file can use the PID provided by the monitoring driver to terminate the ransomware process at 324.

Figure 3E:
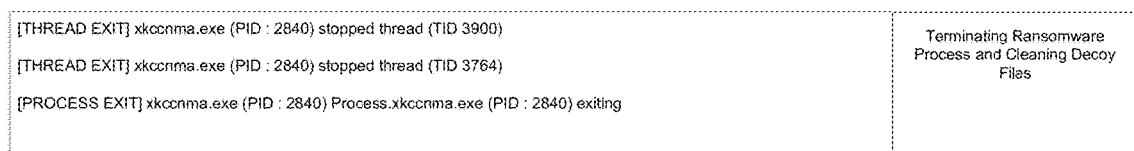

FIG. 3E illustrates termination of ransomware process and cleaning of one or more deployed decoy files. In an aspect, in response to termination by the monitoring file, malicious threads (e.g., thread identifier (TID) 3900 and TID 3764) associated with the ransomware process and the ransomware process are halted. In the current example, "[THREAD EXIT] xkccnma.exe (PID: 2840) stopped thread (TID 3900)" indicates a malicious thread relating to PID 2840 and having a TID of 3900 has been terminated and "xkccnma.exe (PID: 2840) stopped thread (TID 3764)" indicates a malicious thread relating to PID 2840 and having a TID of 3764 has been terminated. After all threads associated with the ransomware process have been terminated, the ransomware process itself is terminated as reflected by "[PROCESS EXIT] xkccnma.exe (PID: 2840) Process.xkccnma.exe (PID: 2840) exiting."

Using a network security metaphor, the solution proposed herein is bringing the idea of a honeypot to the local file system; however, in the present context, it is not fake network services that are being published but rather the use of the decoy files to catch live attacks in progress. As those skilled in the art will appreciate, as the mechanism proposed herein for preventing further damage by the ransomware process is triggered only after tampering with a decoy file by the ransomware process has been detected, some damage will likely already have been done by the ransomware process. Also, termination of the ransomware process will result in the victim not being presented with the ransom note. As such, the victim will be unable to pay the ransom and will likely lose at least some data that the ransomware process was able to encrypt before termination of the ransomware process was triggered.

Figure 4:
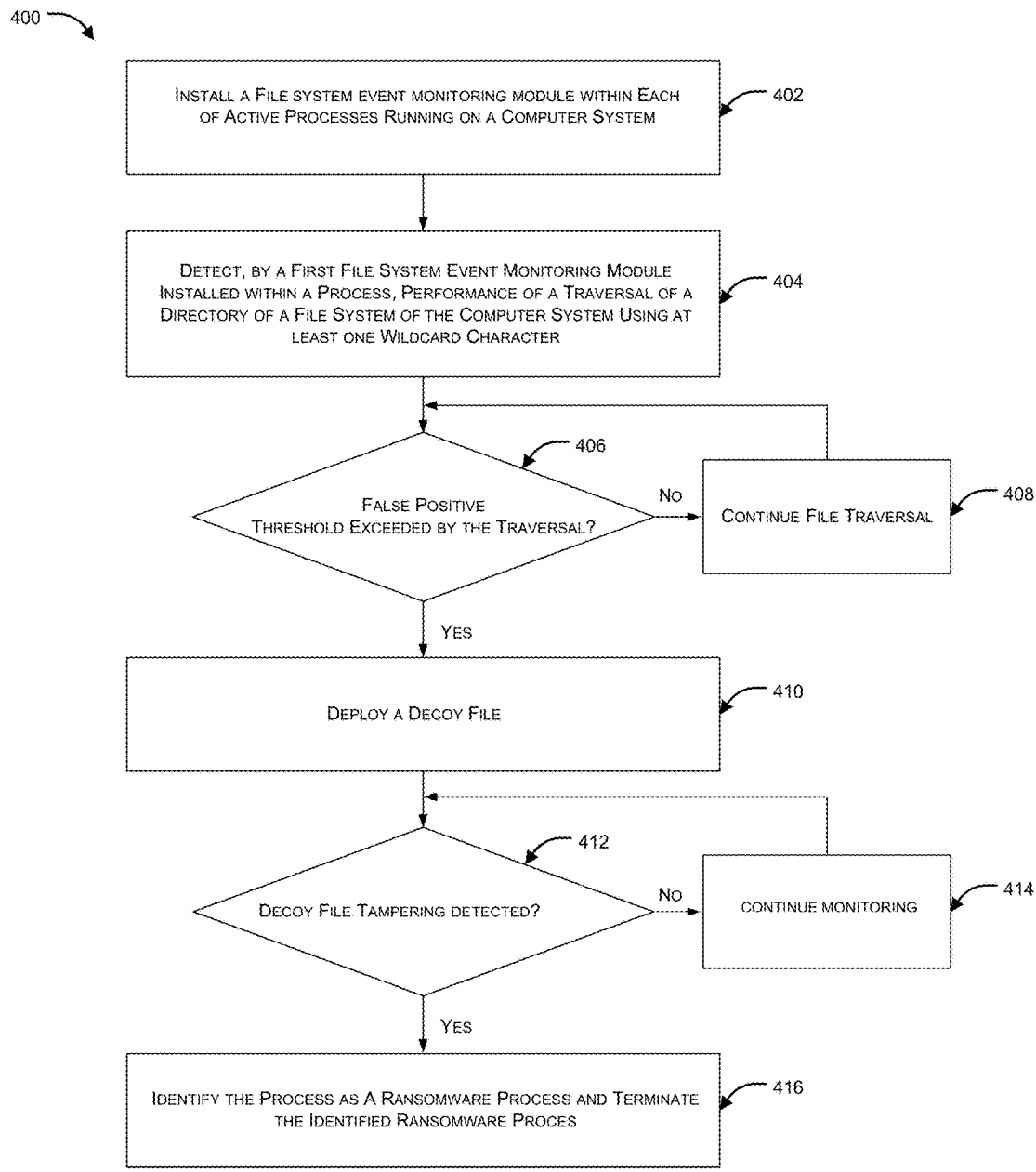
FIG. 4 is a flow diagram illustrating the detection and termination of a ransomware process in accordance with an embodiment of the present invention.

FIG. 4 is a simplified flow diagram 400 illustrating detection and termination of a ransomware process in accordance with an embodiment of the present invention. At step 402, upon activation, the monitoring driver, installs a file system event monitoring module (a/k/a the monitoring file) within each active process running on the computer system. As noted below with reference to FIG. 6A, the file system event monitoring module can also be injected into new processes that are subsequently created.

At step 404, one of the installed file system event monitoring modules (e.g., a first file system event monitoring module) detects performance of a directory traversal operation that makes use of at least one wildcard character.

At step 406, it is determined whether a false positive threshold has been exceeded by this directory traversal. If so, then processing continues with step 410; otherwise the process continues to traverse files at step 408.

At step 410, responsive to the number of wildcard-based directory traversals performed by the process meeting a predetermined or configurable false positive threshold, the file system event monitoring module deploys a decoy file within the directory and notifies the driver regarding the deployment.

At step 412, the driver (having been informed of the decoy file deployment by the file system event monitoring module) begins monitors file system activity to detect whether an attempt is made by the process to tamper with the decoy file.

At step 414, when a file system activity is detected that (i) is unrelated to the decoy file or (ii) relates to the decoy file but is unrelated to the process that triggered deployment of the decoy file, then the file system activity is allowed to proceed without action by the driver and file system activity monitoring continues at block 412.

At step 416, when tampering with the decoy file is detected by the process that triggered the deployment of the decoy file, the driver identifies the process as a ransomware process and causes the ransomware process to be terminated. As described further below with reference to FIG. 6D, in one embodiment deployed decoy files and the associated PIDs of the process that caused them to be deployed can be tracked by the driver to facilitate detection of the type of decoy file tampering that is of interest to the driver.

Figure 5A:
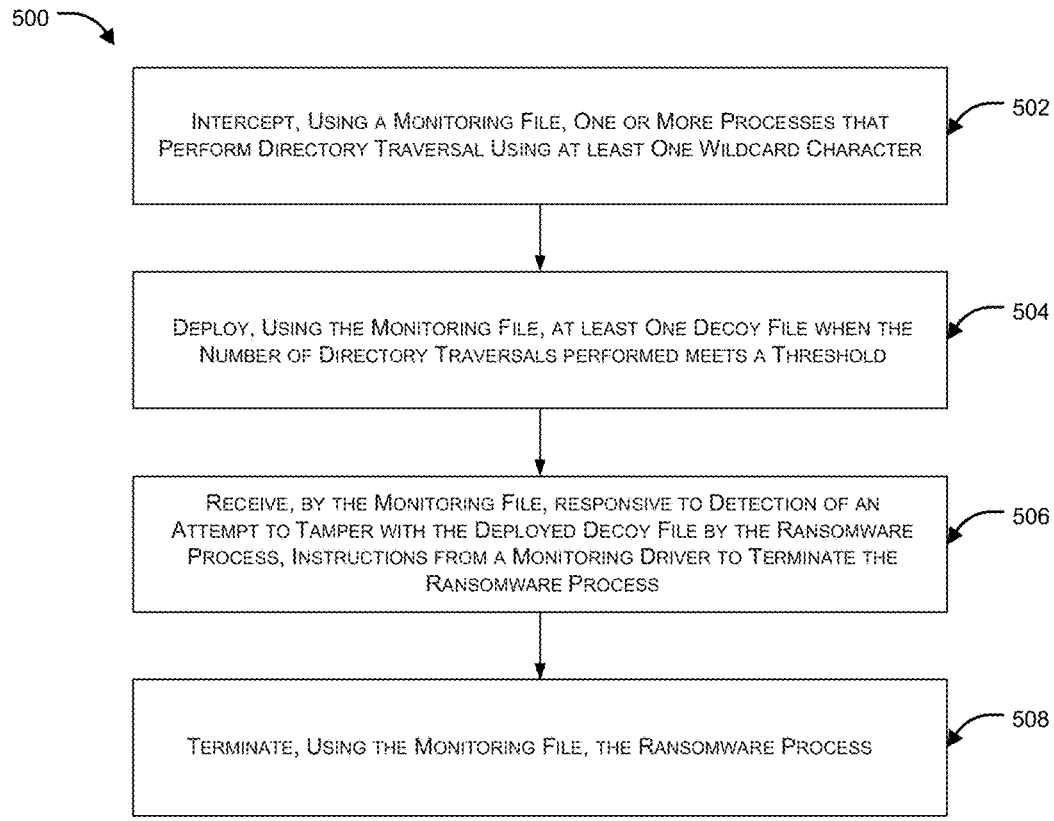
FIG. 5A is a flow diagram illustrating monitoring file processing in relation to directory traversals and termination of a confirmed ransomware process in accordance with an embodiment of the present invention.

FIG. 5A is a flow diagram 500 illustrating monitoring file processing in relation to directory traversals and termination of a confirmed ransomware process in accordance with an embodiment of the present invention.

In the context of the present example, at step 502, a monitoring file intercepts directory traversal operations being performed by one or more processes and evaluates the directory traversal operation to determine if a wildcard is contained within one of the parameters.

At step 504, the monitoring file deploys a decoy file within the directory being searched when the number of wildcard-based directory traversal operations performed by the process at issue meets or exceeds a predetermined or configurable false positive threshold. As such, in one embodiment, each time a particular process performs a wildcard-based directory traversal upon meeting the false positive threshold an additional decoy file will be deployed in the directory at issue. According to one embodiment, the filename of the decoy file is both random and unique within the directory at issue. In one embodiment, the decoy file is a hidden file (e.g., in the context of Mac OS X, the invisible attribute is set; in the context of a Unix-like operating system the filename is started with a dot character; in the Windows or DOS environment, a hidden file attribute is set).

At step 506, responsive to the ransomware process making an attempt to tamper with a decoy file, the monitoring file receives a notification from the driver to terminate the ransomware process. According to one embodiment, driver processing in relation to monitoring of a decoy file is performed in accordance with FIG. 5B.

At step 508, the monitoring file terminates the ransomware process.

Figure 5B:
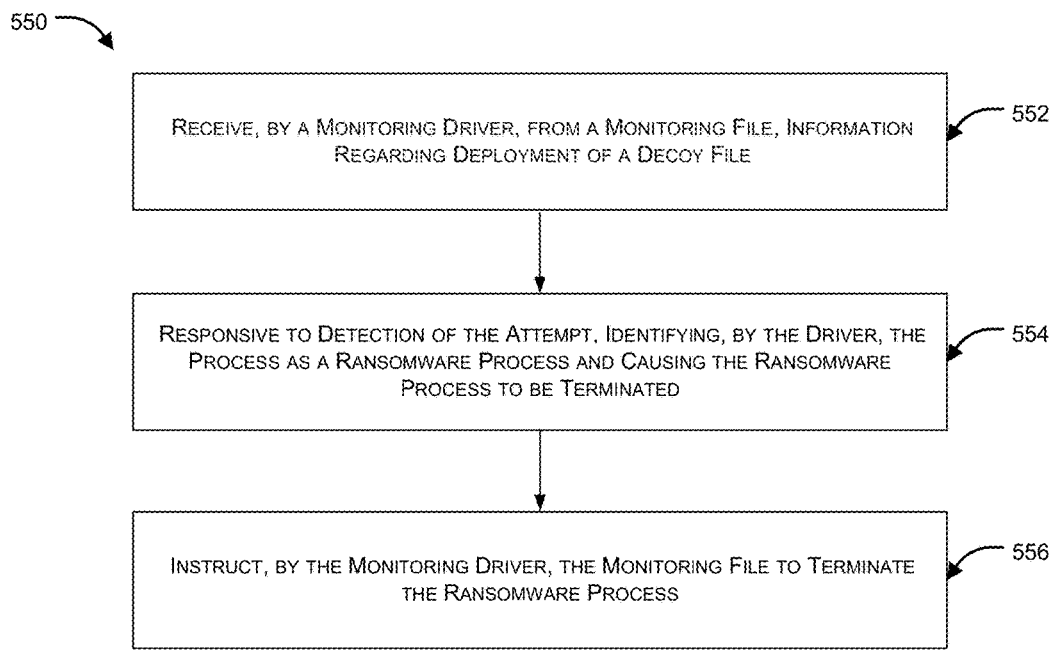
FIG. 5B is a flow diagram illustrating driver processing in relation to monitoring of a decoy file for tampering by a ransomware process in accordance with an embodiment of the present invention.

FIG. 5B is a flow diagram 550 illustrating driver processing in relation to monitoring of a decoy file for tampering by a ransomware process in accordance with an embodiment of the present invention.

At step 552, the monitoring driver and/or a thread associated therewith receives information from a monitoring file regarding deployment of a decoy file. According to one embodiment, the monitoring file provides the PID of the process that caused the decoy file to be deployed. In one embodiment, the monitoring file may provide information regarding the directory in which the decoy file was deployed and/or the name of the decoy file.

At step 554, responsive to detection by the driver and/or a thread associated therewith of an attempt by a process that caused the decoy file to be deployed to tamper with (e.g., access, open, read, write or delete) the decoy file, the driver and/or a thread associated therewith identifies the process as a ransomware process and causes the ransomware process to be terminated at step 556.

At step 556, the monitoring driver and/or a thread associated therewith instructs the monitoring file to terminate the ransomware process. According to one embodiment, the monitoring driver and/or a thread associated therewith provides the monitoring file with the PID of the process to be terminated and the monitoring file issues a TaskKill command in Windows or the like.

FIGS. 6A to 6F illustrate more detailed flow diagrams showing an exemplary implementation of detection and termination of a ransomware process in accordance with an embodiment of the present invention.

Starting with FIG. 6B, which represents processing performed by a main thread of a monitoring/filter driver, at step 602, the monitoring/filter driver is started.

At step 604, an anti-ransomware (AR) monitoring file is associated with each of the existing processes. In one embodiment, the AR monitoring file is implemented in the form of a DLL and injected into each of the existing processes. In another embodiment, the AR monitoring file runs separate and apart from the existing processes and monitors file system activity (e.g., directory traversals) performed thereby.

At step 606, a system worker thread is launched (e.g., forked) by the monitoring driver to periodically receive information regarding new processes that are subsequently created. In one embodiment, this thread comprises system worker thread 616 of FIG. 6A.

Figure 6D:
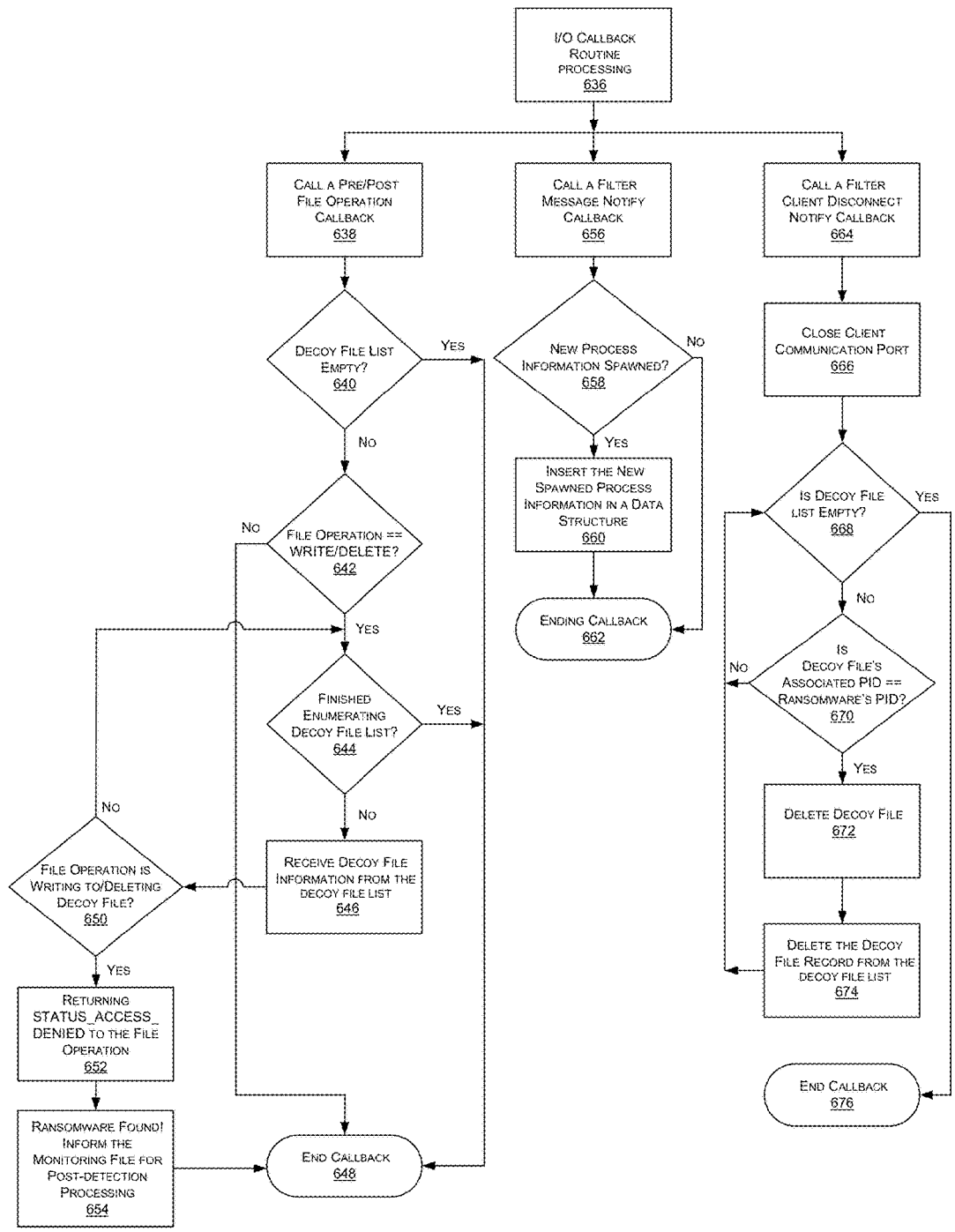

At step 608, the driver registers a process notify callback routine (e.g., to perform notify callback routine processing 628 of FIG. 6C) and an I/O callback routine 636 (e.g., to perform I/O callback routine processing of FIG. 6D).

At steps 610 and 612, the main thread of the driver simply waits until it is notified to be unloaded, allowing the launched thread and the callback routines to perform the tasks of detecting and tracking new process creation, injection of the monitoring file into newly created processes and handling I/O callback processing. When the driver is directed to be unloaded processing branches to step 614 during which unloading of filter driver is performed.

With reference to FIG. 6A, which represents a system worker thread that polls a new process data structure, at step 616, the system worker thread processing begins.

At step 618, the system worker thread determines whether it is to be terminated. If so, then processing branches to step 626; otherwise processing continues with step 620.

At step 620, a check is performed to determine whether any process information is present in a new process data structure that is populated by notify callback routine processing 628. When no information is present, processing loops back to and continues with step 618; otherwise, when information is present in the new process data structure, then processing branches to step 622 until the system worker thread is terminated or process information is found in the new process data structure.

At step 622, the monitoring file is injected into the one or more new processes identified within new process data structure.

At step 624, the process information is removed from the data structure.

At step 626, it has been determined that the system worker thread is to be terminated and processing proceeds with step 614 of FIG. 6B.

Turning now to FIG. 6C, representing the process notify callback routine registered by the driver at step 608 of FIG. 6B, notify callback routine processing begins at step 628.

At step 630, it is determined whether the process that triggered this callback routine is a new process. If so, then processing continues with step 632; otherwise, processing branches to step 634.

At step 632, new process information associated with the process (e.g., the process name and/or the PID) is inserted into the data structure.

At step 634, process information is removed from the data structure.

With reference to FIG. 6D, representing an exemplary I/O callback routine registered by the driver at step 608 of FIG. 6B, at step 636, I/O callback routine processing begins.

At step 638, a pre/post file operation callback is invoked to evaluate a file system operation.

At step 656, a filter message notify callback is invoked to handle new process creation.

At step 664, a filter client disconnect notify callback is invoked to handle clean up of deployed decoy files associated with a ransomware process.

At step 640, a determination is made regarding whether a decoy file list is empty. If so, then processing branches to step 648; otherwise processing continues with step 642.

In one embodiment, at step 642, another check is performed to determine whether the file operation at issue is a write or a delete operation. If so, then processing continues with step 644; otherwise, processing branches to step 648. In other embodiments, other file operations, e.g., open and/or read, can additionally or alternatively be considered as attempted tampering operations.

At steps 644, 646 and 650, the decoy file list is enumerated and decoy file information (e.g., the filename of the decoy file) is retrieved from the decoy file list to determine whether the file operation at issue is directed to a deployed decoy file. If the decoy file list enumeration completes without matching a decoy file within the decoy file list at step 650 then the file operation was not directed to a deployed decoy file and processing branches to step 648; otherwise, the enumeration of decoy file list stops upon finding a match at step 650 in the decoy file list and processing continues with step 652.

At step 652, it has been determined at step 650 that the write or delete file operation at issue is directed to a deployed decoy file. As such, the access is denied by returning a status_access_denied responsive to the file operation.

At step 654, the monitoring file is informed regarding the detection of a ransomware process and directed to perform post detection processing.

At step 648, the I/O callback routine processing is completed.

Returning to the filter message notify callback processing, at step 658, it is determined whether a new process has been spawned. If so, then, at step 660, information associated with the new process is inserted into the new process data structure; otherwise, processing branches to step 662 at which the callback ends.

Returning to the filter client disconnect notify callback processing, at step 666, the client communication port is closed.

At step 668, it is determined if the decoy file list is empty or enumeration of the decoy file list has been completed. If so, then processing branches to step 676 at which the callback routine ends; otherwise, processing continues with step 670.

At step 670, it is determined whether the PID associated with the current decoy file in the decoy file list and the PID of the detected ransomware process are the same—meaning the decoy file at issue was deployed as a result of the ransomware process performing a number of wildcard-based directory traversals meeting or exceeding the false positive threshold. When the PID associated with the decoy file matches the PID of the ransomware process, then processing continues with step 672; otherwise processing loops back to step 668 to process the next decoy file in the decoy file list.

At step 672, the decoy file is deleted from the local file system.

At step 674, the decoy file record is deleted from the decoy file list. After deletion of the decoy file record from the decoy file list, processing loops back to step 668 to process the next decoy file in the decoy file list until all decoy files associated with the detected ransomware process have been cleaned up.

Figures 6E, 6F:
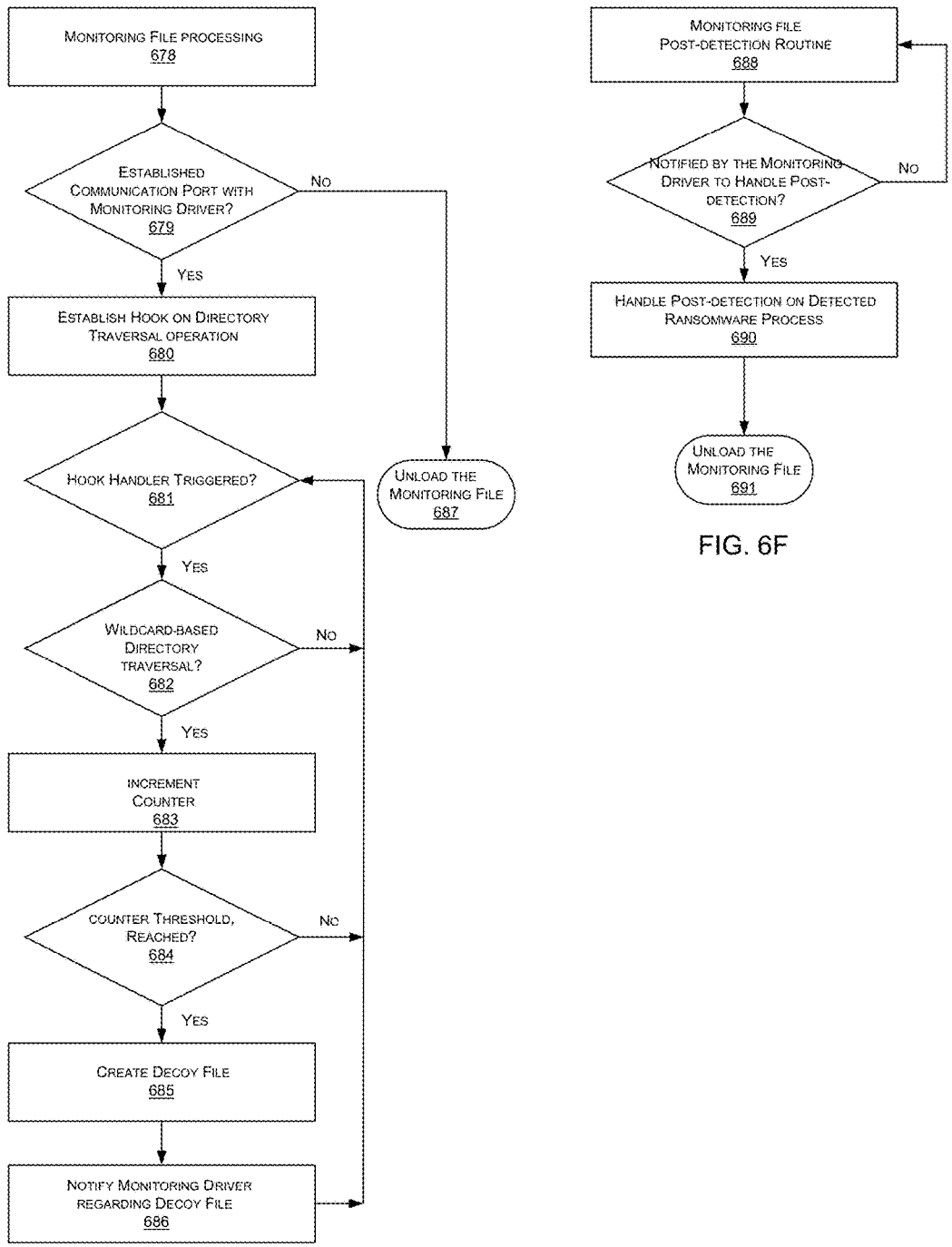

FIG. 6E is a flow diagram representing monitoring file processing in accordance with an embodiment of the present invention. In the present example, monitoring file processing begins at step 678.

At step 679, it is determined whether a communication port is established with the monitoring driver. If so, then processing continues with step 680; otherwise processing branches to step 687 where the monitoring file is unloaded.

At step 680, a hook on the directory traversal operation is established so as to cause a call to be made to a directory traversal operation handler associated with the file monitor responsive to directory traversal operations initiated by the process with which the monitoring file is associated.

At step 681, a determination is made regarding whether the hook handler has been triggered. If so, then processing continues with step 682; otherwise, processing loops back to step 681 until the hook handler is triggered.

At step 682, it is further determined whether the directory traversal operation at issue is wildcard-based (i.e., involves one or more wildcard characters). If so, then processing continues with step 683; otherwise, processing loops back to step 681.

At step 683, a counter tracking the number of wildcard-based directory traversals for the process at issue is incremented or initialized if this is the first wildcard-based directory traversal for this process.

At step 684, it is determined whether the predetermined or configurable false positive threshold has been met or exceeded. If so, then processing continues with step 685; otherwise, processing loops back to step 681.

At step 685, a decoy file is created within the directory at issue.

At step 686, a notification message is sent to monitoring driver informing it of the newly deployed decoy file. According to one embodiment, the information regarding the decoy file includes one or more of the filename of the decoy file, the directory in which the decoy file was created and the PID of the process that caused the decoy file to be deployed.

After sending notification message to the monitoring driver, processing loops back to step 681.

FIG. 6F represents post detection processing performed by the monitoring file in accordance with an embodiment of the present invention. In the present example, at step 688, a monitoring file post detection routine is initiated.

At step 689, it is determined whether the monitoring file has been notified by the monitoring driver to handle post-detection processing associated with a ransomware process. If so, processing continues with step 690; otherwise, processing loops back to step 689 until such time as the monitoring file is notified by the driver to perform post ransomware detection processing.

At step 690, post ransomware process detection processing is performed.

At step 691, the monitoring file is unloaded.

Figure 7:
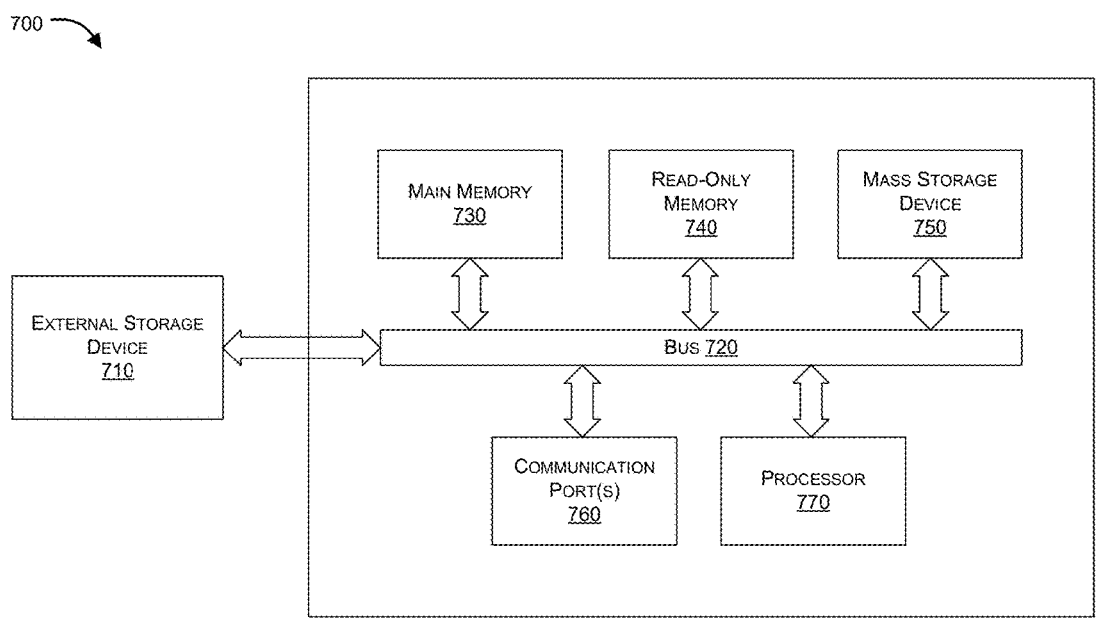
FIG. 7 illustrates an exemplary computer system in which or with which embodiments of the present invention may be utilized.

FIG. 7 illustrates an exemplary computer system in which or with which embodiments of the present invention may be utilized.

In an embodiment, monitoring file and monitoring driver can be configured in the computer system 700, which may represent an end user device (e.g., a client workstation, a tablet computer, a smartphone or the like), to enable aspects of the present disclosure. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

In the present example, computer system 700 includes an external storage device 710, a bus 720, a main memory 730, a read only memory 740, a mass storage device 750, communication port 760, and a processor 770. Those skilled in the art will appreciate that computer system 700 may include more than one processor and communication ports. Examples of processor 770 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 770 may execute various modules associated with embodiments of the present invention.

Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system 700 connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g., start-up or BIOS instructions for processor 770.

Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with computer system 700. Other operator and administrative interfaces can be provided through network connections connected through communication port 760. External storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
    installing, by a kernel mode driver running on a computer system, a file system event monitoring module within each of a plurality of active processes running on the computer system;
    detecting, by a first file system event monitoring module installed within a first process of the plurality of active processes, performance of a directory traversal operation on a directory of a file system of the computer system in which a parameter of the directory traversal operation includes at least one wildcard character;
    when a number of wildcard-based directory traversal operations performed by the first process meets or exceeds a false positive threshold, then deploying, by the first file system event monitoring module, a decoy file within the directory and notifying the kernel mode driver regarding deployment of the decoy file;

monitoring and detecting, by the kernel mode driver an attempt by the first process to tamper with the decoy file by intercepting and evaluating file system operations; and responsive to detection of the attempt, identifying, by the kernel mode driver, the first process as a malware process and causing the malware process to be terminated.

2. The method of claim 1, wherein said causing the malware process to be terminated comprises the kernel mode driver directing the first file system event monitoring module to terminate the first process.

3. The method of claim 1, wherein the plurality of active processes include processes running on the computer system at a time at which the kernel mode driver is initiated on the computer system and new run-time processes that are created after initiation of the kernel mode driver.

4. The method of claim 1, wherein the file system event monitoring module is implemented as a dynamically linked shared library.

5. The method of claim 1, further comprising causing, by the kernel mode driver, the installed file system event monitoring modules to be unloaded after said causing the malware process to be terminated.

6. The method of claim 1, further comprising removing, by the kernel mode driver, the decoy file from the directory.

7. The method of claim 1, wherein the at least one wildcard character comprises an '*', a '.', or a '?'.

8. The method of claim 1, wherein the plurality of active processes are tracked by inserting a reference to or a process identifier of each of the plurality of active processes within a data structure maintained by the kernel mode driver.

9. A computer system comprising:
a non-transitory storage device having embodied therein one or more routines operable to detect and terminate a detected malware process; and
one or more processors coupled to the non-transitory storage device and operable to execute the one or more routines, wherein the one or more routines include:
a file system event monitoring module, which when executed by the one or more processors, intercepts a directory traversal operation within a file system of the computer system that has been initiated by a process executing on the computer system and determines whether a parameter of the directory traversal operation includes a wildcard character;
a decoy file deployment module, which when executed by the one or more processors, determines whether a false positive threshold has been met or exceeded by a number of wildcard-based directory traversal operations performed by the process and responsive to an affirmative determination deploys a decoy file within a directory targeted by the directory traversal operation; and
a decoy file tampering detection module associated with a kernel mode driver, which when executed by the one or more processors, determines whether the decoy file is being tampered with by a malware process by intercepting and evaluating file system operations and responsive to an affirmative determination that the decoy file is being tampered with causes the malware process to be terminated.

10. The system of claim 1, wherein the malware process is terminated by the file system event monitoring module responsive to being directed to do so by the decoy file tampering detection module.

11. The system of claim 1, wherein the file system event monitoring module is implemented within a dynamically linked shared library, and wherein the dynamically linked shared library is injected into the processes.

12. A non-transitory computer-readable storage medium embodying a set of instructions, which when executed by one or more processors of a computer systems, causes the one or more processors to perform a method comprising:
installing, by a kernel mode driver running on the computer system, a file system event monitoring module within each of a plurality of active processes running on the computer system;
detecting, by a first file system event monitoring module installed within a first process of the plurality of active processes, performance of a directory traversal operation on a directory of a file system of the computer system in which a parameter of the directory traversal operation includes at least one wildcard character;
when a number of wildcard-based directory traversal operations performed by the first process meets or exceeds a false positive threshold, then deploying, by the first file system event monitoring module, a decoy file within the directory and notifying the kernel mode driver regarding deployment of the decoy file;
monitoring and detecting, by the kernel mode driver an attempt by the first process to tamper with the decoy file by intercepting and evaluating file system operations; and
responsive to detection of the attempt, identifying, by the kernel mode driver, the first process as a malware process and causing the malware process to be terminated.

13. The non-transitory computer-readable storage medium of claim 12, wherein said causing the malware process to be terminated comprises the kernel mode driver directing the first file system event monitoring module to terminate the first process.

14. The non-transitory computer-readable storage medium of claim 12, wherein the plurality of active processes include processes running on the computer system at a time at which the kernel mode driver is initiated on the computer system and new run-time processes that are created after initiation of the kernel mode driver.

15. The non-transitory computer-readable storage medium of claim 12, wherein the file system event monitoring module is implemented as a dynamically linked shared library.

16. The non-transitory computer-readable storage medium of claim 12, wherein the method further comprises causing, by the kernel mode driver, the installed file system event monitoring modules to be unloaded after said causing the malware process to be terminated.

17. The non-transitory computer-readable storage medium of claim 12, wherein the method further comprises removing, by the kernel mode driver, the decoy file from the directory after said causing the malware process to be terminated.

18. The non-transitory computer-readable storage medium of claim 12, wherein the at least one wildcard character comprises an '*', a '.', or a '?'.

19. The non-transitory computer-readable storage medium of claim 12, wherein the plurality of active processes are tracked by inserting a reference to or a process identifier of each of the plurality of active processes within a data structure maintained by the kernel mode driver.

* * * * *